US012596768B2

(12) United States Patent
Ma et al.

(10) Patent No.: US 12,596,768 B2
(45) Date of Patent: Apr. 7, 2026

(54) WAFER PATTERN IDENTIFICATION SYSTEM AND METHOD

(71) Applicant: YANGTZE MEMORY TECHNOLOGIES CO., LTD., Wuhan (CN)

(72) Inventors: Miaomiao Ma, Wuhan (CN); Jin Lyu, Wuhan (CN); Zhenghang Wang, Wuhan (CN); Peipei Chen, Wuhan (CN); Tao Huang, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 541 days.

(21) Appl. No.: 17/834,560

(22) Filed: Jun. 7, 2022

(65) Prior Publication Data

US 2023/0394113 A1     Dec. 7, 2023

(51) Int. Cl.
*G06F 18/22* (2023.01)

(52) U.S. Cl.
CPC ..................................... *G06F 18/22* (2023.01)

(58) Field of Classification Search
None
See application file for complete search history.

(56) References Cited

U.S. PATENT DOCUMENTS

| | | | |
|---|---|---|---|
| 2013/0288403 A1* | 10/2013 | Chen ....................... | H01L 22/20 700/110 |
| 2015/0079700 A1* | 3/2015 | Ke .......................... | H01L 22/20 438/5 |
| 2015/0219715 A1* | 8/2015 | Schachtner ........ | G01R 31/2834 702/118 |
| 2021/0111150 A1* | 4/2021 | Liu .......................... | H01L 25/50 |

* cited by examiner

*Primary Examiner* — Raymond L Nimox
(74) *Attorney, Agent, or Firm* — BAYES PLLC

(57) ABSTRACT

A pattern identification system is disclosed. The pattern identification system includes a memory configured to store instructions and a processor coupled to the memory and configured to execute the instructions to perform a process. The process includes receiving measurement data associated with the wafer pattern. The process may also include determining a similarity value between the wafer pattern and a reference pattern associated with a reference wafer based on the measurement data. The process may further include determining whether the similarity value satisfies a similarity condition. Responsive to the similarity value satisfying the similarity condition, the process may additionally include identifying a failure mode associated with the wafer pattern based on the reference pattern of the reference wafer.

20 Claims, 6 Drawing Sheets

<u>100</u>

<u>100</u>

302
REFERENCE
WAFER 301
WAFER 1
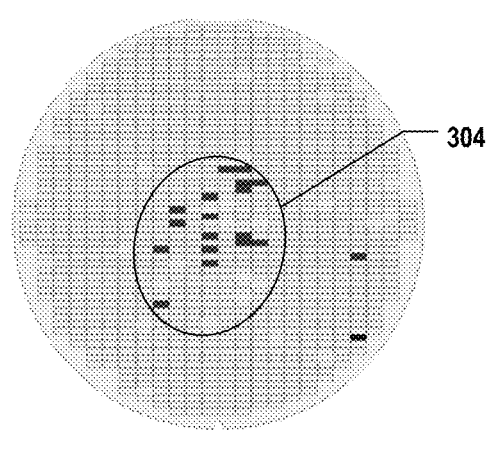
304
WAFER 2
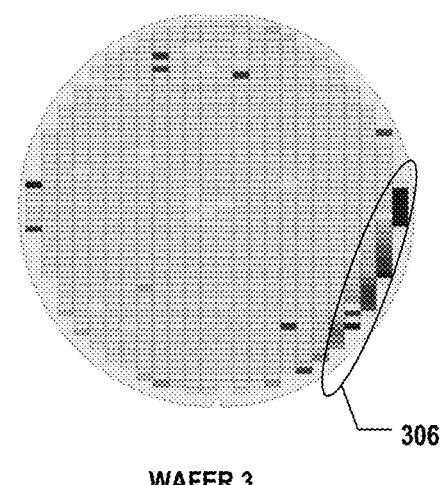
306
WAFER 3
308
WAFER 4
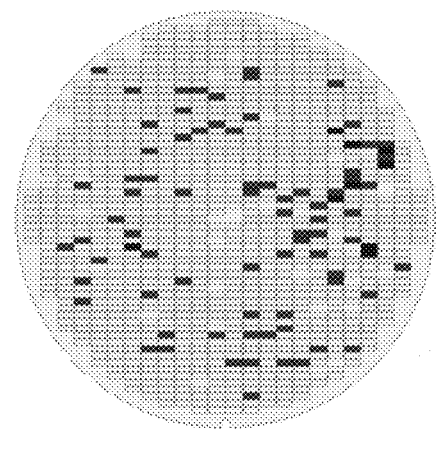
WAFER 5
FIG. 3

TABLE 1

| WAFER NUMBER | COSINE SIMILARITY VALUE |
|---|---|
| WAFER 1 | 0.000 |
| WAFER 2 | 0.054 |
| WAFER 3 | 0.778 |
| WAFER 4 | 0.762 |
| WAFER 5 | 0.077 |

FIG. 4

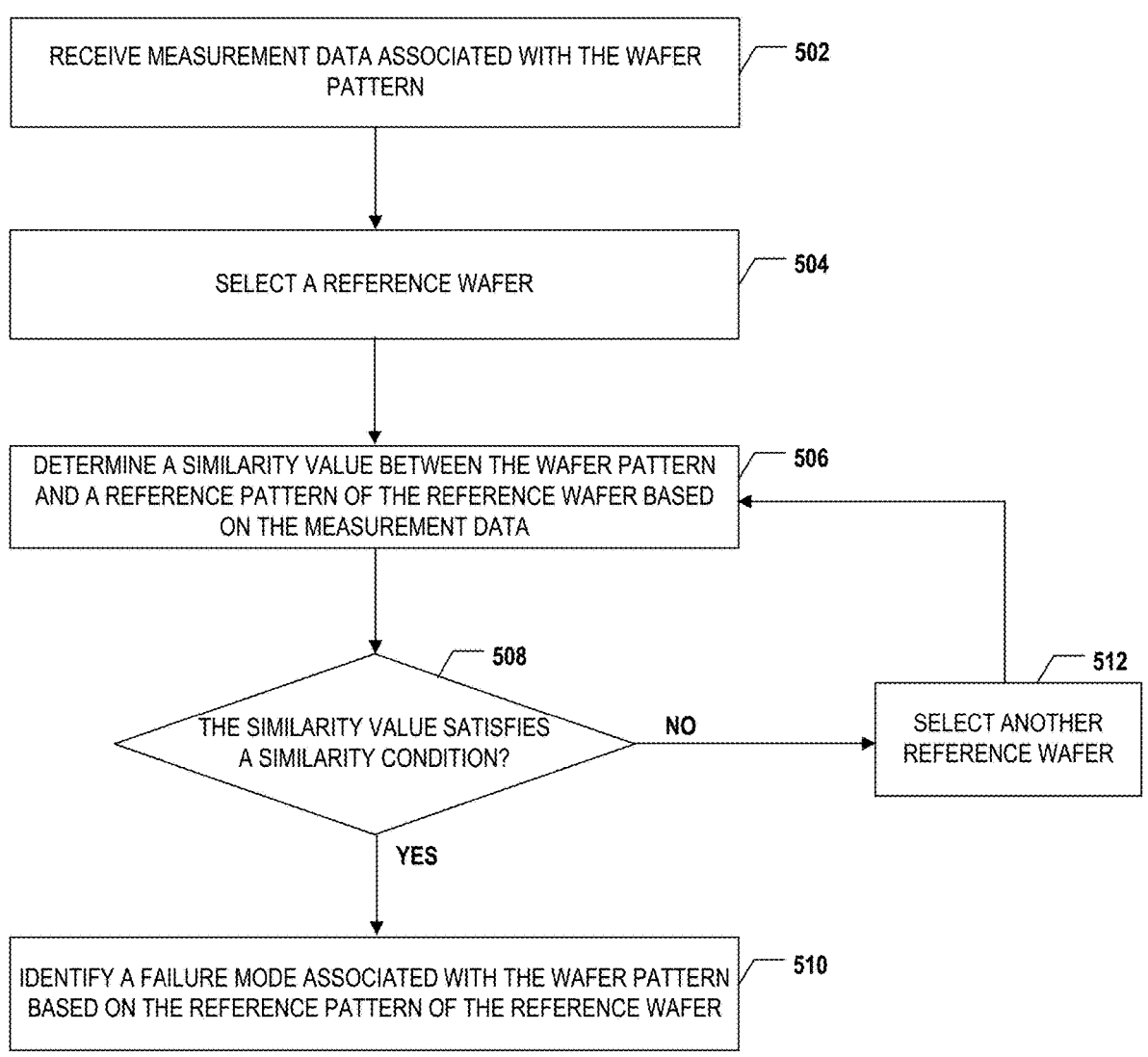

500

RECEIVE MEASUREMENT DATA ASSOCIATED WITH THE WAFER PATTERN — 502

SELECT A REFERENCE WAFER — 504

DETERMINE A SIMILARITY VALUE BETWEEN THE WAFER PATTERN AND A REFERENCE PATTERN OF THE REFERENCE WAFER BASED ON THE MEASUREMENT DATA — 506

508

THE SIMILARITY VALUE SATISFIES A SIMILARITY CONDITION?

NO

SELECT ANOTHER REFERENCE WAFER — 512

YES

IDENTIFY A FAILURE MODE ASSOCIATED WITH THE WAFER PATTERN BASED ON THE REFERENCE PATTERN OF THE REFERENCE WAFER — 510

WAFER PATTERN IDENTIFICATION SYSTEM AND METHOD

BACKGROUND

The present disclosure relates to systems and methods for identifying a wafer pattern associated with a wafer.

In semiconductor manufacturing, various semiconductor structures may be formed on a wafer. Before dicing the wafer or semiconductor structures into separate dies to form integrated circuits, a yield test is performed on the wafer. Due to the complexity and dynamic changes in the manufacturing process, the wafer may have a failure pattern suffering from manufacturing defects (such as significant distortion or deformation on the wafer) and fail to pass the yield test. Generally, a failure pattern of a wafer may be caused by equipment failure or process changes during the manufacturing process. It takes time and effort to determine a type of failure pattern for the wafer manually. Especially, when there are many wafers under test, the lobar cost to manually identify potential failure patterns of the wafers is high. The manual identification of the failure patterns is also prone to errors and inefficient.

SUMMARY

Systems and methods for identifying a wafer pattern of a wafer are disclosed herein.

In one aspect, a computer-implemented method for identifying a wafer pattern associated with a wafer is disclosed. The method may include receiving, by a processor, measurement data associated with the wafer pattern. The method may also include determining, by the processor, a similarity value between the wafer pattern and a reference pattern associated with a reference wafer based on the measurement data. The method may further include determining, by the processor, whether the similarity value satisfies a similarity condition. Responsive to the similarity value satisfying the similarity condition, the method may additionally include identifying, by the processor, a failure mode associated with the wafer pattern based on the reference pattern of the reference wafer.

In some implementations, determining the similarity value between the wafer pattern and the reference pattern includes converting the measurement data into a vector for the wafer pattern; determining a reference vector for the reference pattern of the reference wafer, and determining the similarity value between the vector of the wafer pattern and the reference vector of the reference pattern.

In some implementations, the similarity value includes a cosine similarity value indicative of a cosine value of an angle between the vector of the wafer pattern and the reference vector of the reference pattern.

In some implementations, the measurement data includes a plurality of measurement values for a plurality of dies on the wafer, respectively.

In some implementations, converting the measurement data into the vector for the wafer pattern includes converting each measurement value into a corresponding element in the vector.

In some implementations, converting each measurement value into the corresponding element in the vector includes responsive to the measurement value being zero, determining that the corresponding element in the vector is zero; or responsive to the measurement value being a non-zero value, determining that the corresponding element in the vector is equal to a predetermined element value.

In some implementations, the plurality of dies include a plurality of three-dimensional (3D) memory devices on the wafer.

In some implementations, determining whether the similarity value satisfies the similarity condition includes determining whether the similarity value is equal to or greater than a similarity threshold. The similarity value satisfies the similarity condition responsive to the similarity value being equal to or greater than the similarity threshold.

In some implementations, the similarity threshold is adaptively adjusted using an identification feedback loop.

In some implementations, identifying the failure mode associated with the wafer pattern based on the reference pattern of the reference wafer includes identifying that the failure mode associated with the wafer pattern is identical to a reference failure mode associated with the reference pattern of the reference wafer.

In another aspect, a system for identifying a wafer pattern associated with a wafer is disclosed. The system includes a memory configured to store instructions and a processor coupled to the memory and configured to execute the instructions to perform a process. The process may include receiving measurement data associated with the wafer pattern. The process may also include determining a similarity value between the wafer pattern and a reference pattern associated with a reference wafer based on the measurement data. The process may further include determining whether the similarity value satisfies a similarity condition. Responsive to the similarity value satisfying the similarity condition, the process may additionally include identifying a failure mode associated with the wafer pattern based on the reference pattern of the reference wafer.

In some implementations, the system may further include a wafer measurement equipment configured to measure the wafer to provide the measurement data associated with the wafer pattern.

In some implementations, determining the similarity value between the wafer pattern and the reference pattern includes converting the measurement data into a vector for the wafer pattern, determining a reference vector for the reference pattern of the reference wafer, and determining the similarity value between the vector of the wafer pattern and the reference vector of the reference pattern.

In some implementations, the similarity value includes a cosine similarity value indicative of a cosine value of an angle between the vector of the wafer pattern and the reference vector of the reference pattern.

In some implementations, the measurement data includes a plurality of measurement values for a plurality of dies on the wafer, respectively.

In some implementations, converting the measurement data into the vector for the wafer pattern includes converting each measurement 4value into a corresponding element in the vector.

In some implementations, converting each measurement value into the corresponding element in the vector includes responsive to the measurement value being zero, determining that the corresponding element in the vector is zero; or responsive to the measurement value being a non-zero value, determining that the corresponding element in the vector is equal to a predetermined element value.

In some implementations, the plurality of dies include a plurality of 3D memory devices on the wafer.

In some implementations, determining whether the similarity value satisfies the similarity condition includes determining whether the similarity value is equal to or greater than a similarity threshold. The similarity value satisfies the similarity condition responsive to the similarity value being equal to or greater than the similarity threshold.

In yet another aspect, a non-transitory computer-readable storage medium is disclosed. The storage medium is configured to store instructions which, in response to an execution by a processor, cause the processor to perform a process. The process may include receiving measurement data associated with the wafer pattern. The process may also include determining a similarity value between the wafer pattern and a reference pattern associated with a reference wafer based on the measurement data. The process may further include determining whether the similarity value satisfies a similarity condition. Responsive to the similarity value satisfying the similarity condition, the process may additionally include identifying a failure mode associated with the wafer pattern based on the reference pattern of the reference wafer.

BRIEF DESCRIPTION OF THE DRAWINGS

The accompanying drawings, which are incorporated herein and form a part of the specification, illustrate aspects of the present disclosure and, together with the description, further serve to explain the present disclosure and to enable a person skilled in the pertinent art to make and use the present disclosure.

FIG. 3 illustrates a top view of various example wafers, according to some implementations of the present disclosure.

FIG. 4 illustrates example similarity values associated with the various wafers of FIG. 3, according to some implementations of the present disclosure.

FIG. 5 illustrates a flowchart of a method for identifying a wafer pattern of a wafer, according to some implementations of the present disclosure.

Figure 1:
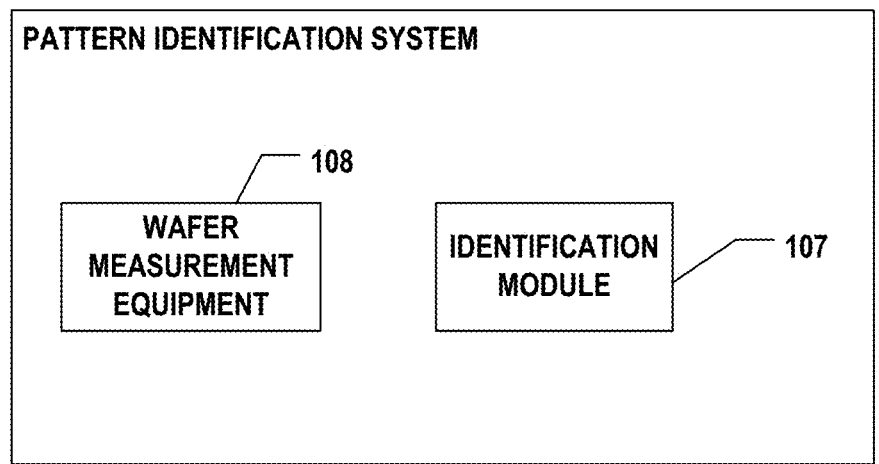
FIG. 1 illustrates a schematic diagram of an example pattern identification system for identifying a wafer pattern of a wafer, according to some implementations of the present disclosure.

The present disclosure will be described with reference to the accompanying drawings.

DETAILED DESCRIPTION

Although specific configurations and arrangements are discussed, it should be understood that this is done for illustrative purposes only. As such, other configurations and arrangements can be used without departing from the scope of the present disclosure. Also, the present disclosure can also be employed in a variety of other applications. Functional and structural features as described in the present disclosures can be combined, adjusted, and modified with one another and in ways not specifically depicted in the drawings, such that these combinations, adjustments, and modifications are within the scope of the present discloses.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure introduces a pattern identification system and method that can identify a failure mode associated with a wafer pattern of a wafer. The identification of the failure mode can be performed based on a similarity value of the wafer pattern relative to a reference pattern of a reference wafer. The similarity value can be a cosine similarity value calculated based on the wafer pattern and the reference pattern. The pattern identification system and method disclosed herein may determine whether the similarity value satisfies a similarity condition (e.g., whether the similarity value is equal to or greater than a similarity threshold). If the similarity value satisfies the similarity condition (e.g., the similarity value is equal to or greater than the similarity threshold), the pattern identification system and method may identify that a failure mode of the wafer pattern is consistent with (e.g., identical to) a reference failure mode of the reference pattern. Thus, subsequent processing (such as inspection, wafer disposal, etc.) can be performed based on the reference failure mode. For example, responsive to identifying that the failure mode of the wafer pattern is identical to the reference failure mode of the reference pattern, routine processing procedures associated with the reference failure mode can be triggered and performed for the wafer.

Consistent with certain aspects of the present disclosure, the pattern identification system and method disclosed herein can automatically identify failure modes associated with wafer patterns of wafers under test so that the failure analysis speed and wafer disposal efficiency of the wafers can be improved. As a result, the production efficiency of semiconductor manufacturing can be enhanced, and the production cost thereof can be reduced. For example, in the pattern identification system and method disclosed herein, a similarity value can be calculated automatically for the identification of a failure mode associated with a wafer pattern of a wafer. Thus, the failure mode of the wafer pattern can be identified efficiently compared to a manual identification of the failure mode. The labor cost for the manual identification of the failure mode can be avoided, and potential errors caused by the manual identification of the failure mode can also be eliminated.

Consistent with certain aspects of the present disclosure, a failure mode associated with a wafer pattern of a wafer (e.g., a failure wafer pattern) may be caused by equipment failure or process changes during the manufacturing process of the wafer. For example, a first failure mode of a first wafer (e.g., a first failure wafer pattern) can be associated with a severe scratch on the first wafer during a particular manufacturing stage or caused by a particular manufacturing machine. A second failure mode of a second wafer (e.g., a second failure wafer pattern) can be associated with a distortion of dies in a particular direction or location of the second wafer (e.g., in an upper left corner of the second wafer). Other example failure wafer patterns are also possible, which is not limited herein. It is contemplated that the pattern identification system and method disclosed herein can handle the identification of any type of failure wafer patterns.

FIG. 1 illustrates a schematic diagram of an example pattern identification system 100 for identifying a wafer pattern of a wafer, according to some implementations of the present disclosure. In some implementations, pattern identification system 100 may include at least one processor, at least one memory, and at least one storage. It is understood that pattern identification system 100 may also include any other suitable components for performing functions described herein. In some implementations, pattern identification system 100 may be implemented using a desktop computer, a laptop computer, a working station, a server, or any suitable devices. An example implementation of pattern identification system 100 is described below in more detail with reference to FIG. 6.

In some implementations, pattern identification system 100 may have different modules in a single device, such as an integrated circuit (IC) chip, or separate devices with dedicated functions. For example, the IC may be implemented as an application-specific integrated circuit (ASIC) or a field-programmable gate array (FPGA). In some implementations, one or more components of pattern identification system 100 may be located in a cloud computing environment or may be alternatively in a single location or distributed locations. Components of pattern identification system 100 may be in an integrated device or distributed at different locations but communicate with each other through a network (not shown in the figure).

Pattern identification system 100 may include a wafer measurement equipment 108 configured to measure a wafer to provide measurement data associated with a wafer pattern of the wafer. Alternatively, wafer measurement equipment 108 may be separate from pattern identification system 100 and coupled to pattern identification system 100 through a physical cable, a wireless connection, Internet, or any suitable connection methods to provide the measurement data to pattern identification system 100.

The measurement data may indicate a degree of variations (e.g., deformation, distortion, etc.) of the wafer formed with semiconductor structures thereon. The wafer pattern can be characterized by the degree of variations of the wafer. The measurement data may include a plurality of measurement values for a plurality of dies in the wafer, respectively. A measurement value of a particular die may indicate a degree of variations associated with the die. For example, a zero value may indicate that there is no deformation on the die, and a non-zero value may indicate that there is deformation on the die. A greater measurement value may indicate a higher deformation on the die.

In some implementations, wafer measurement equipment 108 may include an image capture unit (not shown in the figure) and an image identification unit (not shown in the figure). The image capture unit may be a camera, a scanner, a charge-coupled device (CCD) or complementary metal oxide semiconductor (CMOS) sensor, or other suitable devices for capturing an image of a wafer pattern of a wafer formed with semiconductor structures thereon. The image identification unit may include a processor that can run software code stored in a memory for wafer pattern measurement. For example, the wafer pattern measurement may be achieved by any suitable pattern recognition algorithms that can recognize any deformation (or distortion) on the wafer, including, but not limited to, classification, clustering, ensemble learning, arbitrarily structured labels, multilinear subspace learning, real-valued sequence labeling, regression, and sequence labeling. The processor may include, for example, a central processing unit (CPU), a graphic processing unit (GPU), a digital signal processor (DSP), a neural processing unit (NPU), or any combinations thereof. The image identification unit may generate the measurement data for the wafer pattern of the wafer based on the image captured by the image capture unit.

In some implementations, wafer measurement equipment 108 may include laser interferometers or capacitance gauges for measuring the variations (or deformation, distortion) of the wafer and generating the measurement data thereof. Other implementations of wafer measurement equipment 108 are also possible.

Pattern identification system 100 may also include an identification module 107 configured to identify the wafer pattern of the wafer. For example, identification module 107 may identify a failure mode associated with the wafer pattern of the wafer based on the measurement data provided by wafer measurement equipment 108. Identification module 107 can be hardware units (e.g., portions of an integrated circuit) of a processor of pattern identification system 100 designed for use with other components of system 100. Alternatively or additionally, identification module 107 may include software units implemented by the processor through executing at least part of a program. The program may be stored on a computer-readable medium, and when executed by the processor, it may perform one or more functions disclosed herein. Identification module 107 is described below in more detail with reference to FIGS. 2-5.

Figure 2:
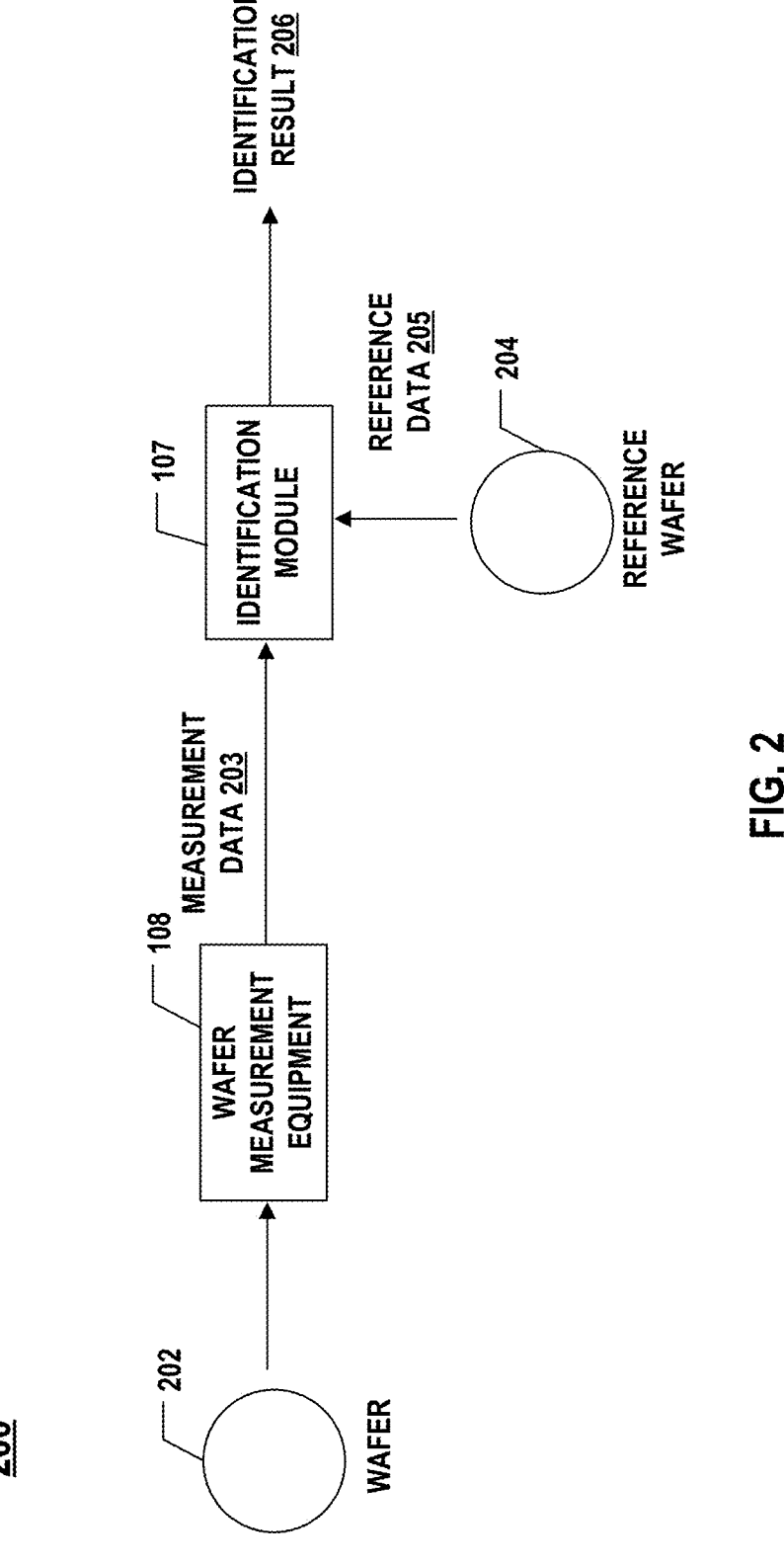
FIG. 2 illustrates a schematic diagram of an example framework of a pattern identification process, according to some implementations of the present disclosure.

FIG. 2 illustrates a schematic diagram of an example framework 200 of a pattern identification process, according to some implementations of the present disclosure. The pattern identification process may be performed by pattern identification system 100 of FIG. 1. Initially, a wafer 202 under test may be placed on a measurement platform, and wafer measurement equipment 108 may measure wafer 202 to generate measurement data 203 associated with a wafer pattern of wafer 202. Measurement data 203 may include a plurality of measurement values for a plurality of dies in wafer 202, respectively. Wafer measurement equipment 108 may provide measurement data 203 to identification module 107. The plurality of dies may include a plurality of semiconductor structures (e.g., a plurality of three-dimensional (3D) memory devices) formed on wafer 202.

Identification module 107 may receive measurement data 203 associated with the wafer pattern of wafer 202 from wafer measurement equipment 108. Identification module 107 may convert measurement data 203 into a vector for the wafer pattern of wafer 202. In some implementations, identification module 107 may convert each measurement value included in measurement data 203 into a corresponding element in the vector. For example, for each measurement value included in measurement data 203, if the measurement value is smaller than a threshold (e.g., the measurement value is zero), identification module 107 may determine that the corresponding element in the vector is zero. If the measurement value is equal to or greater than the threshold (e.g., the measurement value is a non-zero value equal to or greater than the threshold), identification module 107 may determine that the corresponding element in the vector is equal to a predetermined element value (e.g., 1 or any other suitable positive value). The threshold can be zero or have any other suitable value. Thus, each element in the vector may have a zero value or a predetermined element value. The elements in the vector may correspond to the measurement values included in measurement data 203, respectively (e.g., the elements in the vector may have a one-to-one correspondence with the measurement values included in measurement data 203). The total number of elements in the vector is equal to the total number of measurement values included in measurement data 203.

For example, measurement data 203 may include N measurement values, including 0, x1, 0, 0, x2, . . . , 0, 0, x3, with each of x1, x2, and x3 being greater than the threshold. Then, the N measurement values may be converted to a vector for the wafer pattern of wafer 202, with the vector having N elements corresponding to the N measurement values, respectively. The N elements of the vector may include 0, 1, 0, 0, 1, . . . , 0, 0, 1, where each of x1, x2, and x3 are converted to the predetermined element value "1."

Identification module 107 may also receive reference data 205 describing a reference pattern of a reference wafer 204 from a storage device of pattern identification system 100. Reference data 205 may include a plurality of measurement values for a plurality of dies in reference wafer 204, respectively. The plurality of dies may include a plurality of semiconductor structures (e.g., a plurality of 3D memory devices) formed on reference wafer 204. The reference pattern may be described by reference data 205. The reference pattern can be any available failure wafer pattern that is used as a reference for a failure mode.

Identification module 107 may convert reference data 205 into a reference vector for the reference pattern of reference wafer 204. For example, for each measurement value included in reference data 205, if the measurement value is zero, identification module 107 may determine that the corresponding element in the reference vector is zero. If the measurement value is a non-zero value, identification module 107 may determine that the corresponding element in the reference vector is equal to the predetermined element value.

Next, identification module 107 may determine a similarity value between the wafer pattern of wafer 202 and the reference pattern of reference wafer 204 based on measurement data 203 and reference data 205. In some implementations, identification module 107 may determine a similarity value between the vector of the wafer pattern and the reference vector of the reference pattern. For example, the similarity value may include a cosine similarity value indicative of a cosine value of an angle between the vector of the wafer pattern and the reference vector of the reference pattern. The cosine similarity value may be determined based on the following equation:

$$\text{cosine}(A, B) = \text{cosine}(\theta) = \frac{A \cdot B}{|A||B|}. \quad (1)$$

In the above equation (1), A and B denote the vector of the wafer pattern and the reference vector of the reference pattern, respectively. $\theta$ denotes an angle between the two vectors A and B. A·B denotes a dot product between the two vectors A and B. |A| and |B| denote an absolute value of the vector of the wafer pattern and an absolute value of the reference vector of the reference pattern, respectively. cosine (A, B) can be used to measure a direction difference between the two vectors A and B, and may have a value in a range of [−1, 1]. A larger value of cosine(A, B) may indicate a smaller angle between the two vectors A and B. When the directions of the two vectors A and B are the same, cosine(A, B) has the largest value of 1; and when the directions of the two vectors A and B are opposite to one another, cosine(A, B) has a smallest value of −1. In some implementations, the cosine similarity value may be equal to cosine(A,B). In this case, the cosine similarity value may be in a range of [−1, 1]. Alternatively, the cosine similarity value may be equal to an absolute value of cosine(A, B) (e.g., |cosine(A, B)|). In this case, the cosine similarity value may be in a range of [0, 1].

For example, in a two-dimensional (2D) space (e.g., measurement data 203 including two measurement values), $A=(x_1, x_2)$, and $B=(y_1, y_2)$. Then, $$\text{cosine}(A, B) = \frac{x_1 y_1 + x_2 y_2}{\sqrt{x_1^2 + x_2^2} \sqrt{y_1^2 + y_2^2}}.$$

In a n-dimensional space with n≥2 (e.g., measurement data 203 including n measurement values), $A=(x_1, x_2, \ldots, x_n)$, and $B=(y_1, y_2, \ldots, y_n)$. Then, $$\text{cosine}(A, B) = \frac{\sum_{k=1}^{n} x_k y_k}{\sqrt{\sum_{k=1}^{n} x_k^2} \sqrt{\sum_{k=1}^{n} y_k^2}}.$$

Further, identification module 107 may determine whether the similarity value satisfies a similarity condition. Identification module 107 may generate an identification result 206 based on whether the similarity value satisfies the similarity condition. Identification result 206 may indicate whether wafer 202 has a failure wafer pattern like that of reference wafer 204. That is, responsive to the similarity value satisfying the similarity condition, identification module 107 may identify a failure mode associated with the wafer pattern of wafer 202 based on the reference pattern of reference wafer 204. Responsive to the similarity value not satisfying the similarity condition, identification module 107 may determine that wafer 202 does not have a failure wafer pattern like that of reference wafer 204.

For example, identification module 107 may determine whether the similarity value is equal to or greater than a similarity threshold. Responsive to the similarity value being equal to or greater than the similarity threshold, identification module 107 may identify that the failure mode associated with the wafer pattern of wafer 202 is consistent with (e.g., identical to) a reference failure mode associated with the reference pattern of reference wafer 204.

In another example, the similarity value is compared to the similarity threshold to determine whether the wafer pattern of wafer 202 is similar to the reference pattern. If the similarity value is equal to or greater than the similarity threshold, identification module 107 may determine that the wafer pattern of wafer 202 is similar to the reference pattern. Thus, wafer 202 is determined to have the same failure wafer pattern as reference wafer 204.

In some implementations, the similarity threshold can be adjusted dynamically based on actual needs. In some implementations, the similarity threshold may be adaptively adjusted using an identification feedback loop at least by: comparing an identification result with a ground truth result to determine whether an error exists in the identification result; and adjusting a value of the similarity threshold based on whether the error exists in the identification result. For example, a feedback loop can be established to adaptively adjust the similarity threshold, such that a previous identification result can be compared with its ground truth result to determine whether an error exists in the previous identification result. If there is an error in the previous identification result, the error can be fed back to pattern identification system 100 to increase or decrease a value of the similarity threshold depending on the actual applications.

For example, if a false positive rate associated with a particular failure mode is greater than a first error threshold, then identification module 107 may increase the similarity threshold to reduce the likelihood that a wafer is identified to have the particular failure mode (so that the false positive rate can be decreased). If a false negative rate associated with a particular failure mode is greater than a second error threshold, then identification module 107 may decrease the similarity threshold to increase the likelihood that a wafer is identified to have the particular failure mode (so that the false-negative rate can be decreased).

After the identification of the failure mode associated with the wafer pattern of wafer 202, subsequent processing can be performed on wafer 202 based on the reference failure mode of reference wafer 204. For example, responsive to identifying that the failure mode of the wafer pattern of wafer 202 is identical to the reference failure mode of the reference pattern, routine processing procedures associated with the reference failure mode can be triggered and performed for wafer 202. The routine processing procedures can be predetermined automatically or by a user.

For example, if the reference failure mode of reference wafer 204 is usually caused by a failure of a particular manufacturing equipment in the manufacturing process, then it can be determined that the failure mode of wafer 202 is also caused by the same failure of the manufacturing equipment in the manufacturing process. Pattern identification system 100 may generate an instruction to prompt an inspection of the manufacturing equipment.

In another example, if the reference failure mode of reference wafer 204 is usually caused by a process change in the manufacturing process, then it can be determined that the failure mode of wafer 202 is also caused by the same process change in the manufacturing process. Pattern identification system 100 may generate an instruction to examine and adjust the process change in the manufacturing process.

FIG. 3 illustrates a top view of various example wafers, according to some implementations of the present disclosure. FIG. 4 illustrates example similarity values associated with the wafers of FIG. 3, according to some implementations of the present disclosure. FIGS. 3 and 4 are described together herein. The wafers shown in FIG. 3 includes a reference wafer 301 and five wafers under test (e.g., Wafers 1, 2, 3, 4, and 5). Reference wafer 301 has a reference pattern with deformation 302 distributed on the lower right edge of the wafer. Wafer 1 has a wafer pattern with almost no deformation. Wafer 2 has a wafer pattern with deformation 304 mainly distributed in the middle of the wafer. Wafer 3 has a wafer pattern with deformation 306 mainly distributed on the lower right edge of the wafer, which is similar to the reference pattern of reference wafer 301. Wafer 4 has a wafer pattern with deformation 308 mainly distributed on the lower right edge of the wafer, which is also similar to the reference pattern of reference wafer 301. Wafer 5 has a wafer pattern with deformation distributed almost over the whole wafer.

For each of the five wafers (e.g., Wafers 1, 2, 3, 4, and 5), wafer measurement equipment 108 may measure the wafer to provide a corresponding set of measurement data associated with the wafer. By performing operations like those described above with reference to FIG. 2, identification module 107 may determine a cosine similarity value between the wafer pattern of the wafer and the reference pattern of reference wafer 301 based on the corresponding set of measurement data associated with the wafer and reference data associated with the reference pattern. FIG. 4 includes a table (e.g., Table 1) listing corresponding cosine similarity values for the five wafers, respectively.

For a similarity threshold having a value of 0.5, the cosine similarity values of Wafers 3 and 4 are greater than the similarity threshold, as shown in Table 1. Thus, identification module 107 may determine that Wafers 3 and 4 may have a failure wafer pattern like that of reference wafer 301. For example, a failure mode associated with the wafer pattern of Wafer 3 is identical to a reference failure mode associated with the reference pattern of reference wafer 301. Similarly, a failure mode associated with the wafer pattern of Wafer 4 is identical to the reference failure mode associated with the reference pattern of reference wafer 301.

FIG. 5 illustrates a flowchart of a method 500 for identifying a wafer pattern of a wafer, according to some implementations of the present disclosure. Method 500 may be implemented by pattern identification system 100 (e.g., identification module 107). It is understood that the operations shown in method 500 may not be exhaustive and that other operations can be performed as well before, after, or between any of the illustrated operations. Further, some of the operations may be performed simultaneously, or in a different order than shown in FIG. 5.

Referring to FIG. 5, method 500 starts at operation 502, in which measurement data associated with the wafer pattern of the wafer is received. For example, wafer measurement equipment 108 may measure the wafer to generate the measurement data and provide the measurement data to identification module 107.

Method 500 proceeds to operation 504, as illustrated in FIG. 5, in which a reference wafer is selected. For example, identification module 107 may select a reference wafer from a reference wafer profile stored in a storage device of pattern identification system 100.

Method 500 proceeds to operation 506, as illustrated in FIG. 5, in which a similarity value between the wafer pattern and a reference pattern of the reference wafer is determined based on the measurement data. For example, identification module 107 may determine the similarity value between the wafer pattern and the reference pattern based on the measurement data and reference data describing the reference pattern.

Method 500 proceeds to operation 508, as illustrated in FIG. 5, in which it is determined whether the similarity value satisfies a similarity condition. Responsive to the similarity value satisfying the similarity condition, method 500 proceeds to operation 510. Otherwise, method 500 proceeds to operation 512. In some implementations, responsive to the similarity value not satisfying the similarity condition, method 500 ends.

For example, identification module 107 may determine whether the similarity value is equal to or greater than a similarity threshold. If the similarity value is equal to or greater than a similarity threshold, method 500 may proceed to operation 510. If the similarity value is smaller than the similarity threshold, method 500 may proceed to operation 512 (or method 500 ends).

If method 500 proceeds to operation 510, as illustrated in FIG. 5, a failure mode associated with the wafer pattern is identified based on the reference pattern of the reference wafer. For example, identification module 107 may determine a failure mode of the wafer be identical to a failure reference mode of the reference wafer.

If method 500 proceeds to operation 512, as illustrated in FIG. 5, another reference wafer is selected for the determination of the similarity value. Method 500 may return to operation 506.

Figure 6:
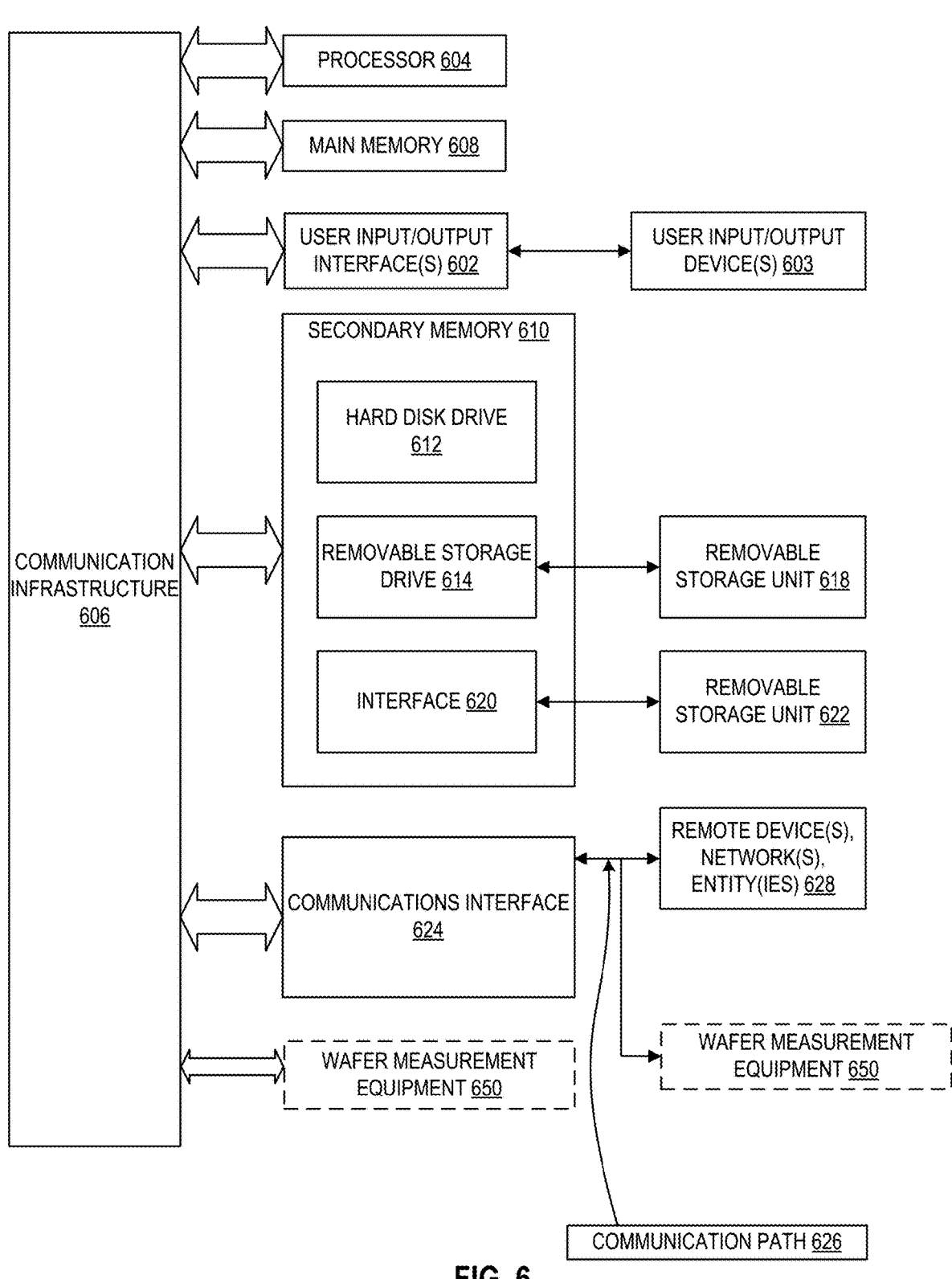
FIG. 6 illustrates a schematic diagram of an example implementation of a pattern identification system, according to some implementations of the present disclosure.

FIG. 6 illustrates a schematic diagram of an example implementation of a pattern identification system 600, according to some implementations of the present disclosure. Pattern identification system 600 may be an example implementation of pattern identification system 100 in FIG. 1. Pattern identification system 600 may include one or more processors (also called central processing units, or CPUs), such as a processor 604. Processor 604 is connected to a communication infrastructure or bus 606, according to some implementations. One or more processors 604 can each be a GPU. In some implementations, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc. In some implementations, identification module 107 may be included in processor 604.

Pattern identification system 600 may also include user input/output device(s) 603, such as monitors, keyboards, pointing devices, etc., which communicate with communication infrastructure or bus 606 through user input/output interface(s) 602.

Pattern identification system 600 may also include a main or primary memory 608, such as random-access memory (RAM). Main memory 608 can include one or more levels of cache. Main memory 608 has stored therein control logic (i.e., computer software) and/or data, according to some implementations.

Pattern identification system 600 may also include one or more secondary storage devices or memory 610. Secondary memory 610 can include, for example, a hard disk drive 612 and/or a removable storage device or drive 614. Removable storage drive 614 can be a floppy disk drive, a magnetic tape drive, a compact disk drive, an optical storage device, tape backup device, and/or any other storage device/drive.

Removable storage drive 614 can interact with a removable storage unit 618. Removable storage unit 618 includes a computer usable or readable storage device having stored thereon computer software (control logic) and/or data, according to some implementations. Removable storage unit 618 can be a floppy disk, magnetic tape, compact disk, digital versatile disc (DVD), optical storage disk, and/any other computer data storage device. Removable storage drive 614 can read from and/or writes to removable storage unit 618.

According to some implementations, secondary memory 610 can include other means, instrumentalities or other approaches for allowing computer programs and/or other instructions and/or data to be accessed by pattern identification system 600. Such means, instrumentalities or other approaches may include, for example, a removable storage unit 622 and an interface 620. Examples of removable storage unit 622 and interface 620 can include a program cartridge and cartridge interface (such as that found in video game devices), a removable memory chip (such as an erasable programmable read-only memory (EPROM) or programmable read-only memory (PROM)) and associated socket, a memory stick and universal serial bus (USB) port, a memory card and associated memory card slot, and/or any other removable storage unit and associated interface.

Pattern identification system 600 may further include a communication or network interface 624. Communication interface 624 enables pattern identification system 600 to communicate and interact with any combination of remote devices, remote networks, remote entities, etc. (individually and collectively referenced by reference number 628), according to some implementations. For example, communication interface 624 may allow pattern identification system 600 to communicate with remote devices 628 over communications path 626, which may be wired and/or wireless, and which may include any combination of local area networks (LANs), wide area networks (WANs), the Internet, etc. Control logic and/or data may be transmitted to and from pattern identification system 600 via communication path 626.

In some implementations, pattern identification system 600 may include a wafer measurement equipment 650. In other words, pattern identification system 600 and wafer measurement equipment 650 may be integrated in one device. In some other implementations, wafer measurement equipment may be coupled to pattern identification system 600 through communication path 626. Wafer measurement equipment 650 can be an example of wafer measurement equipment 108 in FIG. 1.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described example implementations, but should be defined only in accordance with the following claims and their equivalents.

What is claimed is:

1. A computer-implemented method for identifying a wafer pattern associated with a wafer, comprising:
    receiving, by a processor, measurement data associated with the wafer pattern, wherein the measurement data comprises a plurality of measurement values for a plurality of dies on the wafer, respectively;
    converting the measurement data into a vector of the wafer pattern at least by:
        converting a first subset of the measurement values each being smaller than a threshold into a first subset of vector elements each having a zero value, respectively; and
        converting a second subset of the measurement values each being equal to or greater than the threshold into a second subset of vector elements each having a predetermined non-zero value, respectively;
    determining, by the processor, a similarity value between the vector of the wafer pattern and a reference vector of a reference pattern associated with a reference wafer;
    identifying, by the processor, a failure mode associated with the wafer pattern based on the reference pattern of the reference wafer and the similarity value between the vector of wafer pattern and the reference vector of the reference pattern;
    determining if the identified failure mode is due to a process change in a manufacturing process of the plurality of dies on the wafer or a failure of a manufacturing equipment manufacturing the plurality of dies on the wafer; and
    responsive to the identified failure mode being due to the process change in the manufacturing process, adjusting the process change to manufacture a corrected plurality of dies on a new wafer; or, responsive to the identified failure mode being due to the failure of the manufacturing equipment, correcting the failure of the manufacturing equipment to manufacture the corrected plurality of dies on the new wafer.

2. The method of claim 1, wherein determining the similarity value between the vector of the wafer pattern and the reference vector of the reference pattern further comprises:

determining the reference vector for the reference pattern of the reference wafer.

3. The method of claim 2, wherein the similarity value comprises a cosine similarity value indicative of a cosine value of an angle between the vector of the wafer pattern and the reference vector of the reference pattern.

4. The method of claim 3, wherein the similarity value is in a range of [−1, 1] or [0, 1].

5. The method of claim 1, wherein the plurality of dies comprise a plurality of three-dimensional (3D) memory devices on the wafer.

6. The method of claim 1, wherein identifying the failure mode associated with the wafer pattern based on the reference pattern of the reference wafer and the similarity value between the vector of wafer pattern and the reference vector of the reference pattern comprises:

when the similarity value is equal to or greater than a similarity threshold, identifying that the failure mode associated with the wafer pattern is identical to a reference failure mode associated with the reference pattern of the reference wafer.

7. A system for identifying a wafer pattern associated with a wafer, comprising:

a memory configured to store instructions; and a processor coupled to the memory and configured to execute the instructions to perform a process comprising:

receiving measurement data associated with the wafer pattern, wherein the measurement data comprises a plurality of measurement values for a plurality of dies on the wafer, respectively;

converting the measurement data into a vector of the wafer pattern at least by:

converting a first subset of the measurement values each being smaller than a threshold into a first subset of vector elements each having a zero value, respectively; and converting a second subset of the measurement values each being equal to or greater than the threshold into a second subset of vector elements each having a predetermined non-zero value, respectively;

determining a similarity value between the vector of the wafer pattern and a reference vector of a reference pattern associated with a reference wafer;

identifying a failure mode associated with the wafer pattern based on the reference pattern of the reference wafer and the similarity value between the vector of wafer pattern and the reference vector of the reference pattern;

determining if the identified failure mode is due to a process change in a manufacturing process of the plurality of dies on the wafer or a failure of a manufacturing equipment manufacturing the plurality of dies on the wafer; and responsive to the identified failure mode being due to the process change in the manufacturing process, adjusting the process change to manufacture a corrected plurality of dies on a new wafer; or, responsive to the identified failure mode being due to the failure of the manufacturing equipment, correcting the failure of the manufacturing equipment to manufacture the corrected plurality of dies on the new wafer.

8. The system of claim 7, further comprising a wafer measurement equipment configured to measure the wafer to provide the measurement data associated with the wafer pattern.

9. The system of claim 7, wherein determining the similarity value between the vector of the wafer pattern and the reference vector of the reference pattern further comprises:

determining the reference vector for the reference pattern of the reference wafer.

10. The system of claim 9, wherein the similarity value comprises a cosine similarity value indicative of a cosine value of an angle between the vector of the wafer pattern and the reference vector of the reference pattern.

11. The system of claim 7, wherein the plurality of dies comprise a plurality of three-dimensional (3D) memory devices on the wafer.

12. A non-transitory computer-readable storage medium configured to store instructions which, in response to an execution by a processor, cause the processor to perform a process comprising:

receiving measurement data associated with a wafer pattern, wherein the measurement data comprises a plurality of measurement values for a plurality of dies on the wafer, respectively;

converting the measurement data into a vector of the wafer pattern at least by:

converting a first subset of the measurement values each being smaller than a threshold into a first subset of vector elements each having a zero value, respectively; and converting a second subset of the measurement values each being equal to or greater than the threshold into a second subset of vector elements each having a predetermined non-zero value, respectively;

determining a similarity value between the vector of the wafer pattern and a reference vector of a reference pattern associated with a reference wafer;

identifying a failure mode associated with the wafer pattern based on the reference pattern of the reference wafer and the similarity value between the vector of wafer pattern and the reference vector of the reference pattern;

determining if the identified failure mode is due to a process change in a manufacturing process of the plurality of dies on the wafer or a failure of a manufacturing equipment manufacturing the plurality of dies on the wafer; and responsive to the identified failure mode being due to the process change in the manufacturing process, adjusting the process change to manufacture a corrected plurality of dies on a new wafer; or, responsive to the identified failure mode being due to the failure of the manufacturing equipment, correcting the failure of the manufacturing equipment to manufacture the corrected plurality of dies on the new wafer.

13. The method of claim 6, wherein the similarity threshold is adaptively adjusted using an identification feedback loop at least by:

comparing an identification result with a ground truth result to determine whether an error exists in the identification result; and adjusting a value of the similarity threshold based on whether the error exists in the identification result.

14. The method of claim 13, wherein adjusting the value of the similarity threshold comprises:

responsive to a false positive rate associated with the failure mode being greater than a first error threshold, increasing the value of the similarity threshold.

15. The method of claim 13, wherein adjusting the value of the similarity threshold comprises:

responsive to a false negative rate associated with the failure mode being greater than a second error threshold, decreasing the value of the similarity threshold.

16. The system of claim 7, wherein identifying the failure mode associated with the wafer pattern based on the reference pattern of the reference wafer and the similarity value between the vector of wafer pattern and the reference vector of the reference pattern comprises:

when the similarity value is equal to or greater than a similarity threshold, identifying that the failure mode associated with the wafer pattern is identical to a reference failure mode associated with the reference pattern of the reference wafer.

17. The system of claim 16, wherein the similarity threshold is adaptively adjusted at least by:

comparing an identification result with a ground truth result to determine whether an error exists in the identification result; and adjusting a value of the similarity threshold based on whether the error exists in the identification result.

18. The system of claim 17, wherein adjusting the value of the similarity threshold comprises:

responsive to a false positive rate associated with the failure mode being greater than a first error threshold, increasing the value of the similarity threshold.

19. The system of claim 17, wherein adjusting the value of the similarity threshold comprises:

responsive to a false negative rate associated with the failure mode being greater than a second error threshold, decreasing the value of the similarity threshold.

20. The system of claim 7, wherein the similarity value is in a range of $[-1, 1]$ or $[0, 1]$.

* * * * *